UNITED STATES PATENT OFFICE 2,102,307

PROCESS FOR PREPARING OIL VARNISHES

August Chwala, Vienna, Edmund Waldmann, Klosterneuburg, near Vienna, and Aldo Martina, Vienna, Austria No Drawing. Application February 19, 1936, Serial No. 64,652. In Austria February 28, 1935

8 Claims. (Cl. 134—26)

The object of the present invention resides in the production of a varnish containing drying oil and containing certain other substances which improve the drying process, prevent wrinkling of the varnish film, improve flow of the varnish, and increase the luster of the varnish film.

We have discovered that it is very advantageous to substitute aliphatic and/or aromatic acids having an acetylene linkage or derivatives of such acids or mixtures of such compounds for the acids hitherto used for the above mentioned purpose. For example, propiolic acid ($CH \equiv C.COOH$), methyl acetylene carbo-acid (tetrolic acid, $CH_3.C \equiv C.COOH$), phenyl propiolic acid ($C_6H_5C \equiv C.COOH$) and the like may be used. The varnishes containing a drying oil which are obtained by addition of the above mentioned acids are of excellent quality as regards their flow and luster.

The substances to be admitted to the oil varnish according to the present invention may be added during the preparation of the varnish or afterwards.

In preparing the composition we prefer to use the various ingredients in about the following proportions:

Example 1.—To 200 kilograms of a white oil varnish containing a drying oil prepared in the conventional manner 0.4 kilograms of phenyl propiolic acid ($C_6H_5C \equiv C.COOH$) are added, which are easily dissolved in the varnish. The so obtained varnish shows a very good flow and a high luster.

Example 2.—0.8 kilogram of phenyl propiolic acid ($C_6H_5C \equiv C.COOH$) are dissolved in 200 kilograms of a mixture of boiled linseed oil (standoil) and varnish gasoline. Thereafter 200 kilograms of zinc oxide are added to the mass and the same is thoroughly mixed while grinding. A cobalt siccative is also added.

Example 3.—0.2 kilogram of methyl acetylene carbo-acid (tetrolic acid) ($CH_3.C \equiv C.COOH$) are added to 300 kilograms of a white oil varnish containing a drying oil, prepared in a conventional manner or to 150 kilograms of a mixture of boiled linseed oil (standoil) and varnish gasoline; thereafter 150 kilograms of zinc oxide are added and mixed by grinding.

Example 4.—0.5 kilogram of propiolic acid ($CH \equiv C.COOH$) are dissolved in 100 kilograms of a mixture of boiled linseed oil and varnish gasoline. Thereafter 100 kilograms of zinc oxide are added and mixed by grinding.

Example 5.—To 100 kilograms of a white oil varnish containing a drying oil, prepared in a conventional manner, 0.5 kilogram of chloropropiolic acid ($ClC \equiv C.COOH$) are added and easily dissolved in the varnish.

Example 6.—0.2 kilogram of methyl acetylene carbo-acid (tetrolic acid) ($CH_3.C \equiv C.COOH$) and 0.1 kilogram of phenyl propiolic acid $$(C_6H_5C \equiv C.COOH)$$

are dissolved in 175 kilograms of varnish containing a drying oil and thereafter 150 kilograms of zinc oxide added while grinding. The whole mass is intimately mixed by grinding.

Example 7.—To 100 kilograms of a mixture of woodoil (standoil) and linseed oil we add 0.3 kilogram of chloropropiolic acid ($ClC \equiv C.COOH$), 0.1 kilogram of phenyl propiolic acid $$(C_6H_5C \equiv COOH)$$

and 0.1 kilogram of methyl acetylene carbo-acid (tetrolic acid) ($CH_3.C \equiv COOH$). Thereafter 50 kilograms of zinc oxide are added while grinding.

Example 8.—0.2 kilogram of chloro phenyl propiolic acid ($ClC_6H_4C \equiv C.COOH$) are intimately mixed with a mixture of 100 kilograms of varnish containing a drying oil and 50 kilograms of zinc oxide while grinding.

Example 9.—0.3 kilogram of nitro phenyl propiolic acid ($NO_2C_6H_4C \equiv C.COOH$) are dissolved in 100 kilograms of varnish consisting of 90 kilograms linseed oil and 10 kilograms and more phenol formaldehyde condensation product and are then mixed with 50 kilograms of zinc oxide while grinding.

Example 10.—0.2 kilogram of phenyl propiolic acid ($C_6H_5C \equiv C.CO_2H$) are dissolved in 80 kilograms of cellulose clear varnish and mixed with 20 kilograms of a mixture of 12 kilograms zinc oxide and 8 kilograms of woodoil linseed oil standoil while grinding.

Example 11.—To 100 kilograms of white oil varnish, containing a drying oil, prepared in a conventional manner are added and dissolved 0.6 kilogram of the ester of tetrolic acid with glycollic acid ($CH_3C \equiv C.COOCH_2CO_2H$).

What we claim is:—

1. A varnish of high luster and good flow containing drying oil and an organic compound having an acetylene linkage selected from the group of organic carboxylic acids and substituted organic carboxylic acids.

2. A varnish of high luster and good flow, containing drying oil and tetrolic acid.

3. A varnish of high luster and good flow, containing drying oil and propiolic acid.

4. A varnish of high luster and good flow, containing drying oil and phenyl propiolic acid.

5. A varnish of high luster and good flow containing drying oil and a mixture of organic compounds having an acetylene linkage selected from the group of organic carboxylic acids and substituted organic carboxylic acids.

6. A varnish of high luster and good flow containing drying oil and a mixture of one part of tetrolic acid and one part of phenyl propiolic acid.

7. A varnish of high luster and good flow containing drying oil and a mixture of 40 per cent of chloropropiolic acid, 30 per cent of phenyl propiolic acid and 30 per cent of tetrolic acid.

8. A varnish of high luster and good flow containing drying oil and a mixture of 50 per cent of tetrolic acid, 20 per cent of propiolic acid and 30 per cent of chloro phenyl propiolic acid.

AUGUST CHWALA.
EDMUND WALDMANN.
ALDO MARTINA.